US009928971B2

(12) United States Patent
Johansson et al.

(10) Patent No.: US 9,928,971 B2
(45) Date of Patent: Mar. 27, 2018

(54) ELECTRICAL CONTACT TIP FOR SWITCHING APPLICATIONS AND AN ELECTRICAL SWITCHING DEVICE

(71) Applicant: ABB Schweiz AG, Baden (CH)

(72) Inventors: Gunnar Johansson, Västerås (SE); David Karlén, Västerås (SE); Erik Johansson, Västerås (SE); Reinhard Simon, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/300,616

(22) PCT Filed: Apr. 16, 2014

(86) PCT No.: PCT/EP2014/057695
§ 371 (c)(1),
(2) Date: Sep. 29, 2016

(87) PCT Pub. No.: WO2015/158373
PCT Pub. Date: Oct. 22, 2015

(65) Prior Publication Data

US 2017/0117102 A1 Apr. 27, 2017

(51) Int. Cl.
*B32B 15/01* (2006.01)
*H01H 1/0237* (2006.01)

(52) U.S. Cl.
CPC .... *H01H 1/02374* (2013.01); *H01H 1/02376* (2013.01)

(58) Field of Classification Search
CPC ........... H01H 1/02374; H01H 1/02376; H01H 1/023; H01H 1/0233
See application file for complete search history.

(56) References Cited

U.S. PATENT DOCUMENTS

| | | | | |
|---|---|---|---|---|
| 4,279,033 | A | 7/1981 | Brunelli et al. | |
| 4,672,008 | A | 6/1987 | Shibata | |
| 4,948,424 | A | 8/1990 | Haufe et al. | |
| 5,876,862 | A | 3/1999 | Shibuya et al. | |
| 6,974,923 | B2 * | 12/2005 | Uenishi | C22C 5/06 200/266 |

(Continued)

FOREIGN PATENT DOCUMENTS

| | | | |
|---|---|---|---|
| CN | 1150861 | A | 5/1997 |
| CN | 1823176 | A | 8/2006 |

(Continued)

OTHER PUBLICATIONS

NPL—Eng. Translation Okubo JP2011-210611 (translater Jun. 13, 2017).*
NPL—Doduco, Material Information Silver-Nickel, Dec. 17, 2013, p. 1.*

(Continued)

*Primary Examiner* — David Sample
*Assistant Examiner* — Elizabeth Collister
(74) *Attorney, Agent, or Firm* — Whitmyer IP Group LLC

(57) ABSTRACT

An electrical contact tip for switching applications. The contact tip includes a body having a first layer and a second layer. The first layer arranged on the second layer and adapted to come in contact with a corresponding contact tip during switching operations. The first and second layers consist of Ag-composites of one or more elements, compounds or alloys, where the hardness of the first layer is lower than the hardness of the second layer.

13 Claims, 2 Drawing Sheets

(56) References Cited

U.S. PATENT DOCUMENTS

| | | | | |
|---|---|---|---|---|
| 9,755,343 | B2 * | 9/2017 | Sunaga | C23C 28/023 |
| 2005/0202610 | A1 | 9/2005 | Sadeo et al. | |
| 2006/0239854 | A1 | 10/2006 | Uenishi et al. | |
| 2015/0048054 | A1 * | 2/2015 | Karkada | H01H 1/0233 218/146 |

FOREIGN PATENT DOCUMENTS

| | | | |
|---|---|---|---|
| CN | 102054598 | A | 5/2011 |
| CN | 102668006 | A | 9/2012 |
| DE | 3538684 | A1 | 5/1986 |
| EP | 1041591 | A2 | 10/2000 |
| JP | 2000123667 | A | 4/2000 |
| JP | 2003181976 | A | 7/2003 |
| JP | 2004253229 | A | 9/2004 |
| JP | 2009079250 | A | 4/2009 |
| JP | 5345095 | A | 8/2013 |

OTHER PUBLICATIONS

NPL—Braunovic, Milenko Konchits, Valery V. Myshkin, Nikolai K.., Electrical Contacts—Fundamentals, Applications and Technology, (2006), Taylor & Francis, p. 297.*

Anonymous: "We Know How Werkstoffinformation Werkstotfeigenschatten Ag & Ag-Legierungen-1 (siehe DODUCO Datenbuch S. 48 ft)", Apr. 30, 2011 (Apr. 30, 2011), pp. 1-7, www.doduco.net; Retrieved from the Internet: URL:http://www.doduco.neVmedia/34467/silbersilberlegierungen_deutsch_ 12-5-2014_web.pdt; [retrieved on Dec. 5, 2014].

Anonymous: "Doduco—Werkstoff Information Silber-Zinnoxid (Ag/SnO) 2", Apr. 30, 2011 (Apr. 30, 2011), pp. 1-8, www.doduco.net; Retrieved from the Internet: URL:http://www.doduco.neVmedia/55118/silber-zinnoxid_d_2013-03-28.pdt [retrieved on Dec. 5, 2014].

International Preliminary Report on Patentability Application No. PCT/EP2014/057695 dated Apr. 4, 2016 7 pages.

International Search Report and Written Opinion of the International Searching Authority Application No. PCT/EP2014/057695 Commpleted: Dec. 5, 2014;dated Dec. 18, 2014 12 pages.

* cited by examiner

ELECTRICAL CONTACT TIP FOR SWITCHING APPLICATIONS AND AN ELECTRICAL SWITCHING DEVICE

TECHNICAL FIELD

The present invention relates to an electrical contact tip for switching applications, in particular for low voltage applications. The contact tip comprises a body comprising a first layer and a second layer. The first layer is arranged on the second layer and is adapted to come in contact with a corresponding contact tip during switching operations. The first layer and the second layer consist of Ag-composites comprising one or more elements, compounds or alloys. The present invention also relates to an electrical switching device comprising the electrical contact tip.

BACKGROUND

Switching devices, in particular low voltage contactors, have traditionally been used for different load switching applications and the contact material of the electrical contact tip has been chosen for these duties. However, there is an increasing demand for switching devices in applications where there are not many load switching operations. These are for instance isolation and by-pass applications.

The body of the contact tip is typically arranged of a composite material of silver metal oxide (Ag—MeO). The choice of contact tip material is a compromise between several opposing requirements, such as low contact resistance, low erosion wear and good welding properties.

It is desired to use the same contact material of the contact tip for both by-pass and isolation applications as well as for load switching applications. In isolation/by-pass applications low contact resistance to achieve low losses and hence less thermal problems is the main criteria while in load switching applications the life time of the contact tip is the most important parameter. The latter depends mainly on the erosion properties of the contact tip material.

Accordingly, a problem with prior art contact tips for use in both by-pass/isolation applications and load switching applications is that the material properties are not optimized for either of the applications.

To get a low enough contact resistance the materials in prior art contact tips contain typically 86 mass % silver, 12% tin oxide and 2% bismuth oxide. This gives a relatively good compromise between erosion resistance and low contact resistance. A harder material with less silver could give lower erosion rates but would at the same time increase the contact resistance. A softer contact material would do the opposite.

U.S. Pat. No. 4,672,008 discloses an electrical contact provided with a coating adapted to prevent formation of segregation or depletion layer on the outer surface of the contact. The thin layer could be produced by powder metallurgical sintering.

US20060239854 discloses a contact comprising an outer layer adapted to reduce the abrasion of the contact and enable the contact to be used in heavy loads. The outer layer has a higher hardness than the inner layer of the contact.

SUMMARY

A first object of the present invention is to provide an electrical contact tip that has improved properties for use in both by-pass/isolation switching applications and load switching applications compared with prior art contact tips.

A second object of the invention is to provide an electrical contact tip that can be produced more cost effectively than prior art contact tips.

This object is obtained by an electrical contact tip for switching applications, the contact tip comprises a body comprising a first layer and a second layer, the first layer is arranged on the second layer and is adapted to come in contact with a corresponding contact tip during switching operations, wherein the first layer and the second layer consist of Ag-composites comprising one or more elements, compounds or alloys. The contact tip is characterized in that the hardness of the first layer is lower than the hardness of the second layer.

The electrical contact tip is arranged for switching applications, in particular for low voltage applications below 1000 V. The contact resistance and the erosion resistance are dependent on the hardness of the body of the contact tip, wherein a high hardness provides high erosion resistance and high contact resistance, and vice versa.

The first layer has the function of providing low contact resistance. A low contact resistance is of particular importance in by-pass/isolation switching applications. The second layer has the function of providing high erosion resistance. A high erosion resistance is of particular importance in load switching applications.

In isolation/by-pass applications the contact erosion is more or less negligible and the first layer provides low contact resistance through out the life of the contact tip. In load switching applications on the other hand, the low contact resistance is of less importance and the first layer will be worn off early in life of the contact tip. Thereafter, the second layer is exposed and provides high erosion resistance for enduring load switching applications. Accordingly, the invention provides contact tip that enables use in both by-pass/isolation switching applications and load switching applications with improved performance compared with prior art contact tips.

According to an embodiment of the invention, the hardness of the second layer is at least 1.2 times higher than the hardness of the first layer.

According to an embodiment of the invention, the hardness of the first layer is in the range of 50 to 140 Vickers Hv1 and the hardness of the second layer is in the range of 60 to 150 Vickers Hv1.

According to an embodiment of the invention, the resistivity of the first layer is lower than the resistivity of the second layer. A low resistivity is of importance in particular for the first layer in order to provide low contact resistance when used in by-pass/isolation switching applications.

According to an embodiment of the invention, the resistivity of the second layer is at least 1.2 times higher than the resistivity of the first layer.

According to an embodiment of the invention, the resistivity of the first layer is in the range of $1.7 \cdot 10^{-8}$ to $2.6 \cdot 10^{-8}$ $\Omega \cdot m$ and the resistivity of the second layer is in the range of $1.9 \cdot 10^{-8}$ to $2.8 \cdot 10^{-8}$ $\Omega \cdot m$.

According to an embodiment of the invention, the thickness of the first layer is smaller than the thickness of the second layer.

A relatively small thickness of the first layer compared with the second layer is desired as the erosion for by-pass/isolation applications is lower than the erosion for load switching applications.

According to an embodiment of the invention, the thickness of the first layer is between 10 and 40% of the thickness of the second layer.

According to an embodiment of the invention, the content of Ag in the Ag-composite of the first layer is higher than in the Ag-composite of the second layer.

A lower content of Ag is necessary for the second layer compared with the first layer. Thereby, the cost of manufacturing the contact tip of the invention is reduced compared with prior art contact tips in that the Ag constitutes a significant portion of the manufacturing cost.

According to an embodiment of the invention, the Ag-composites comprise metallic Ag-matrix with the one or more elements, compounds or alloys distributed in the Ag-matrix. The Ag-matrix consists of Ag or an Ag-based alloy, and possible impurities.

According to an embodiment of the invention, the content of Ag in the Ag-composite of the first layer is in the range between 70 and 96 wt. % and the content of Ag in the Ag-composite of the second layer is in the range between 40 and 92 wt. %.

According to an embodiment of the invention, the one or more elements, compounds or alloys of the Ag-composite of the first layer and the second layer are selected from the group of Ag, Al, Fe, Sn, C, Cu, Cr, Mo, Ni, Co, W, CdO, $SnO_2$, ZnO, $Fe_2O_3$, WC, MoC, ZrC, $TiB_2$, $ZrB_2$, AgMo, AgCo, AgNi, AgMo, AgCu, AgCr, AgCo, $In_2O_3$, $Bi_2O_3$, $WO_3$, $MoO_3$, CuO.

According to an embodiment of the invention, the first layer comprises a contact zone that comprises serrations. The serrations have the function of improving the electrical contact between the contact tip and a corresponding contact tip in switching applications.

According to an embodiment of the invention, the first layer and the second layer are produced by means of sintering compressed powder mixtures representing the chemical composition of first and second layers. The use of a powder metallurgical process has the advantage that the first layer and the second layer can be produced with high quality.

According to an embodiment of the invention, the body further comprises a third layer arranged on an opposite side to the first layer on the second layer, which third layer has the purpose of attaching the electrical contact tip to an electrical conductor.

The second layer has two sides opposite to each other, the first layer is attached on one side of the second layer and the third layer is attached on the other side of the second layer.

According to an embodiment of the invention, the third layer consists of a material suitable for brazing.

The object of the invention is further obtained by an electrical switching device comprising an electrical contact tip according to the different features of the invention.

BRIEF DESCRIPTION OF THE DRAWINGS

The invention will now be explained more closely by the description of different embodiments of the invention and with reference to the appended figures.

DETAILED DESCRIPTION

Figure 1:
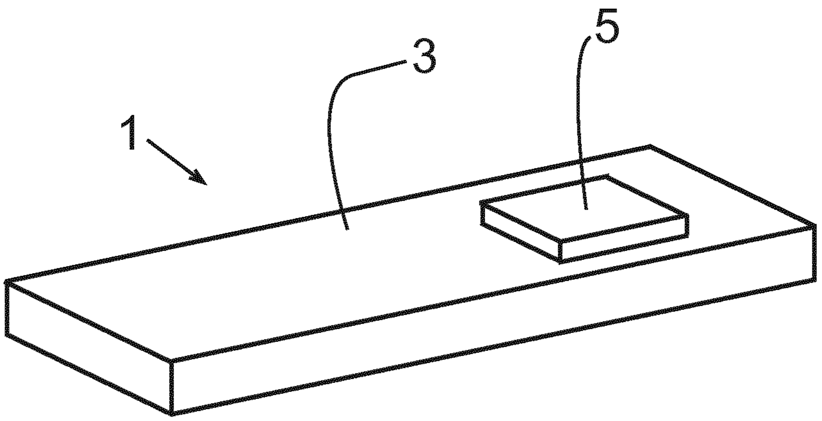
FIG. 1 shows an electrical contact comprising an electrical contact tip according to an embodiment of the invention.

FIG. 1 shows an electrical contact 1 comprising a conductor 3 and an electrical contact tip 5 according to an embodiment of the invention. The contact tip 5 is attached at one end of the conductor 3. The contact tip 5 is adapted to be used in low voltage switching applications of a switching device, in particular voltage below 1000 V.

Figure 2:
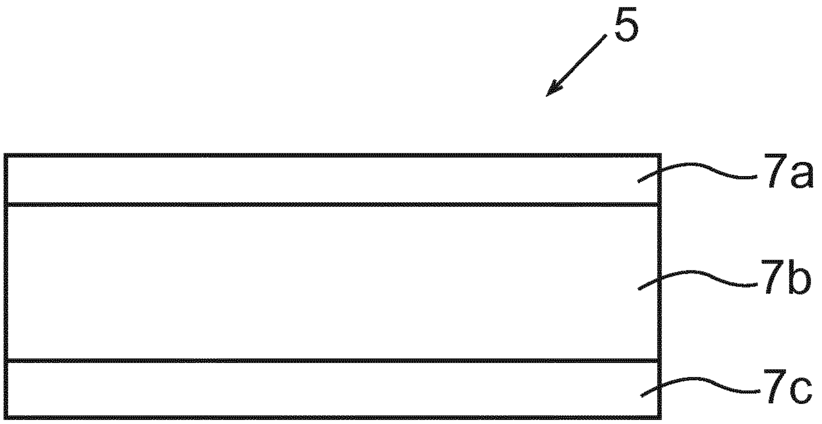
FIG. 2 shows a cross section of the contact tip in FIG. 1.

The contact tip 5 comprises a body comprising a first layer 7*a*, a second layer 7*b* and a third layer 7*c*. FIG. 2 relates to a cross section of the contact tip 5, where the three layers 7*a*, 7*b* 7*c* are disclosed. The first layer 7*a* is arranged on the second layer 7*b*. The second layer 7*b* is arranged on the third layer 7*c*.

The first layer 7*a* is adapted to come in contact with a corresponding contact tip 5 during switching operations in a switching device. The material of the first layer 7*a* has properties that are suitable for by-pass/isolation switching applications, where a low contact resistance is desired but the erosion resistance is of less importance.

The second layer 7*b* is adapted to come in contact with a corresponding contact tip 5 during switching operations in case the first layer 7*a* has been worn off. The second layer 7*b* has properties that are suitable for load switching applications, where a high erosion resistance is desired but the contact resistance is of less importance.

The third layer 7*c* has the function of attaching the contactor tip to the conductor 3. For example, the third layer 7*c* consists of a material suitable for brazing.

The first layer 7*a* and the second layer 7*b* comprise an Ag-composite comprising a metallic matrix of Ag or an Ag-alloy and one or more elements, compounds or alloys distributed in the matrix. In an embodiment the elements or compounds constitute grains of one or more metal oxide. The elements, compounds or alloys of the Ag-composite of the first layer 7*a* and the second layer 7*b* may in particular be selected from the group of Ag, Al, Fe, Sn, C, Cu, Cr, Mo, Ni, Co, W, CdO, $SnO_2$, ZnO, $Fe_2O_3$, WC, MoC, ZrC, $TiB_2$, $ZrB_2$, AgMo, AgCo, AgNi, AgMo, AgCu, AgCr, AgCo, $In_2O_3$, $Bi_2O_3$, $WO_3$, $MoO_3$, CuO.

Figure 3:
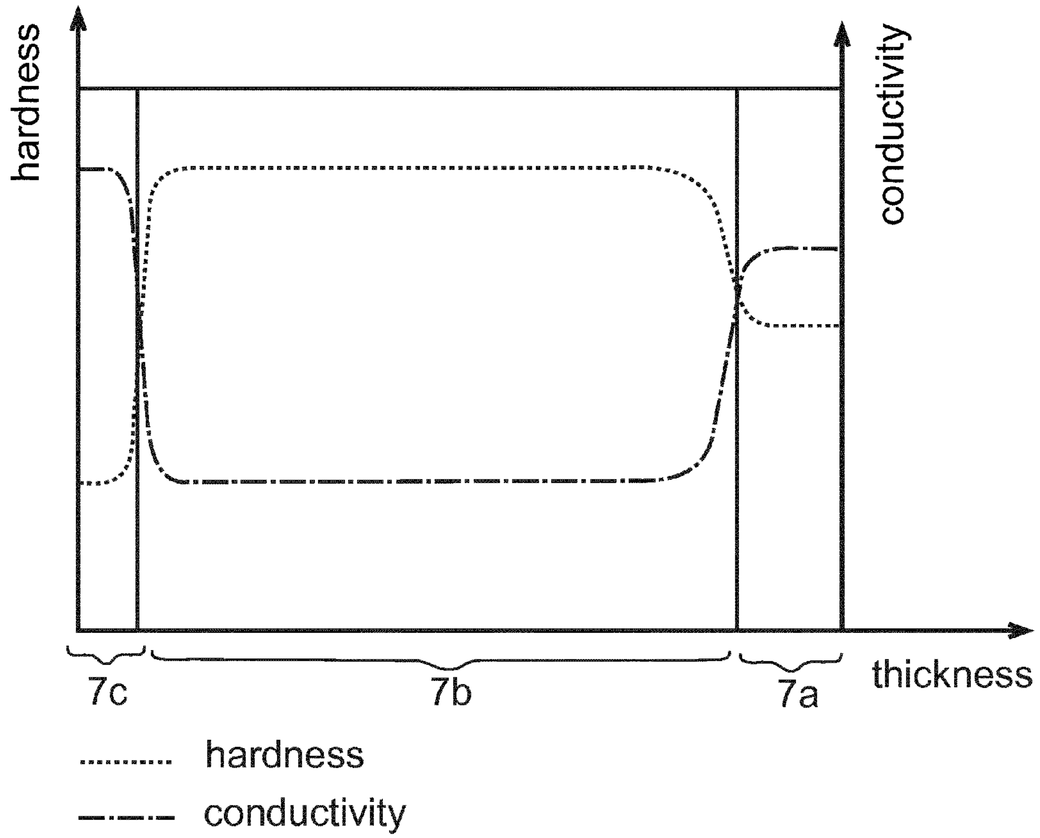
FIG. 3 shows a graph of the hardness and the conductivity of a first layer and a second layer of the contact tip in FIG. 1.

The difference in properties of the first layer 7*a* and the second layer 7*b* is characterized in that the hardness of the first layer 7*a* is lower than the hardness of the second layer 7*b*. Furthermore, the conductivity of the first layer 7*a* is higher than the conductivity of the second layer 7*b*, and accordingly the contact resistance of the first layer 7*a* is lower than the second layer 7*b*, as can be seen in FIG. 3.

The hardness of the first layer 7*a* and second layer 7*b* is dependent on the content of Ag in the Ag-composite, wherein the content of Ag in first layer 7*a* is higher than in the Ag-composite of the second layer 7*b*. Accordingly, the hardness of the first layer 7*a* and the second layer 7*b* is adjusted by adjusting the relationship between the content of Ag and the content of elements, compounds or alloys in the Ag-composites.

The content of Ag in the Ag-composite of the first layer 7*a* is preferably in the range between 70 and 96 wt. % and the content of Ag in the Ag-composite of the second layer 7*b* is preferably in the range between 40 and 92 wt. %.

By adjusting the first layer 7*a* and the second layer 7*b* according to above, the first layer 7*a* receives a lower contact resistance than the second layer 7*b* and the second layer 7*b* receives a higher erosion resistance than the first layer 7*a*.

The first layer 7*a* is suitable for use in by-pass/isolation switching applications because of its low contact resistance. The erosion resistance of the first layer 7*a* is low compared to the second layer 7*b*. However, in by-pass/isolation switching applications the erosion of the contact tip is neglectable in view of the life time of such switching device.

A contact zone of first layer *7a*, adapted to be in direct contact with a corresponding contact tip 5, is preferably provided with serrations for improving the electrical contact with the corresponding contact tip 5.

The second layer *7b* is suitable for use in load switching applications because of its high erosion resistance. The contact resistance of the second layer *7b* is high compared to the first layer *7a*. However, in load switching applications the contact resistance is of less importance for the performance of the switching device. In load switching applications the first layer *7a* will be worn off early in life of the switching device and thereafter the second layer *7b* will be outer surface of the contact tip 5 that comes into contact with a corresponding contact tip 5 of the switching device.

Accordingly, the combination of the first layer *7a* and the second layer *7b* improves the contact tip 5 for use in both by-pass/isolation switching applications and load switching applications compared with prior art contact tips 5.

The hardness of the second layer *7b* is preferably at least 1.2 times higher than the hardness of the first layer *7a*. For example, the hardness of the first layer *7a* is in the range of 50 to 140 Vickers Hv1 and the hardness of the second layer *7b* is in the range of 60 to 150 Vickers Hv1.

Moreover, the resistivity of the second layer *7b* is preferably at least 1.2 times higher than the resistivity of the first layer *7a*. For example, the resistivity of the first layer *7a* is in the range of $1.7 \cdot 10^{-8}$ to $2.6 \cdot 10^{-8}$ Ω·m and the resistivity of the second layer *7b* is in the range of $1.9 \cdot 10^{-8}$ to $2.8 \cdot 10^{-8}$ Ω·m.

It is sufficient for by-pass/isolation applications that the thickness of the first layer *7a* is smaller than the thickness of the second layer *7b*. The thickness of the first layer *7a* is preferably between 10 and 40% of the thickness of the second layer *7b*.

Figure 4:
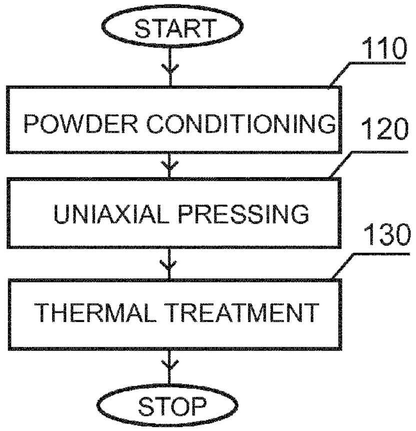
FIG. 4 shows a flow chart of a powder metallurgy process for producing a contact tip according to the invention.

Preferably, the contact tip 5 of the invention is manufactured by means of a powder metallurgy process. The starting raw powders for the first layer *7a*, the second layer *7b* and the third layer *7c* are either metals or a combination of metals and metal oxides. FIG. 4 shows a flow chart of a powder metallurgy process for producing a contact tip 5 according to the invention.

In a first step 110 of the powder metallurgy process the raw powders are subjected to powder conditioning, which typically consists of several sub-steps of chemical powder treatment, mixing, milling, granulation, and sieving. Three different granulated powders are produced, which are to be formed into the first layer *7a*, the second layer *7b* and the third layer *7c*.

In a second step 120 of the powder metallurgy process the powder of the respective layers *7a*, *7b*, *7c* are subjected to uniaxial pressing. A uniaxial pressing die is first filled with a layer of a first zone of powder representing the first layer *7a*, then it is subsequently filled by another layer of a second zone of powder representing the second layer *7b* on top of it, and finally it is subsequently filled by a third zone of powder representing the third layer *7c*. For the filling operation three different powder feeds and die filling shoes are used. The cavity in the die is generated by lowering the lower piston by a distance equal to the individual layer thickness needed for the formation of first, second and third zone. Thereafter, a graded compact is formed by uniaxial pressing. Preferably, also serrations in the first layer *7a* are formed by using an upper piston with an inverted serrated surface geometry. The net-shaped geometry of the body of the contact tip 5 is preferably formed in one pressing step.

In a final step 130 of the powder metallurgy process the graded compact is subjected to thermal treatment. The net-shaped graded compact is thermally treated at temperatures below 1200° C. in either reducing (H2) atmosphere or partly under oxidizing (O2) conditions in order to develop the final material composition and a dense microstructure.

The present invention is not limited to the disclosed embodiments but may be modified within the framework of the claims.

The invention claimed is:

1. An electrical contact tip for switching applications, the contact tip comprising: a body having a first layer and a second layer, the first layer is arranged on the second layer and is configured to come in contact with a corresponding contact tip during switching operations, wherein the first layer and the second layer are each made of a sintered Ag-composite, the Ag-composites of the first layer and the second layer each having an Ag-matrix with impurities and one or more elements, compounds, or alloys distributed in the Ag-matrix, wherein the hardness of the first layer is lower than the hardness of the second layer, wherein the thickness of the first layer is between 10% and 40% of the thickness of the second layer, and wherein the Ag-composite of the first layer comes into or out of contact with the corresponding contact tip to provide bypass-isolation switching, and when the first layer is worn off, the Ag-composite of the second layer comes into or out of contact with the corresponding contact tip to provide load switching.

2. The electrical contact tip according to claim 1, wherein the hardness of the second layer is at least 1.2 times higher than the hardness of the first layer.

3. The electrical contact tip according to claim 1, wherein the hardness of the first layer is in the range of 50 to 140 Vickers Hv1 and the hardness of the second layer is in the range of 60 to 150 Vickers Hv1.

4. The electrical contact tip according to claim 1, wherein the resistivity of the first layer is lower than the resistivity of the second layer.

5. The electrical contact tip according to claim 1, wherein the resistivity of the second layer is at least 1.2 times higher than the resistivity of the first layer.

6. The electrical contact tip according to claim 1, wherein the resistivity of the first layer is in the range of $1.7 \cdot 10^{-8}$ to $2.6 \cdot 10^{-8}$ Ω·m and the resistivity of the second layer is in the range of $1.9 \cdot 10^{-8}$ to $2.8 \cdot 10^{-8}$ Ω·m.

7. The electrical contact tip according to claim 1, wherein the content of Ag in the Ag-composite of the first layer is higher than in the Ag-composite of the second layer.

8. The electrical contact tip according to claim 1, wherein the content of Ag in the Ag-composite of the first layer is in the range between 70 and 96 wt. % and the content of Ag in the Ag-composite of the second layer is in the range between 40 and 92 wt. %.

9. The electrical contact tip according to claim 1, wherein the one or more elements, compounds, or alloys of the Ag-composite of the first layer and the second layer are selected from the group of Al, Fe, Sn, C, Cu, Cr, Mo, Ni, Co, W, CdO, $SnO_2$, ZnO, $Fe_2O_3$, WC, MoC, ZrC, $TiB_2$, $ZrB_2$, AgMo, AgCo, AgNi, AgMo, AgCu, AgCr, AgCo, $In_2O_3$, $Bi_2O_3$, $WO_3$, $MoO_3$, CuO, and combinations of these.

10. The electrical contact tip according to claim 1, wherein the first layer comprises a contact zone that comprises serrations.

11. The electrical contact tip according to claim 1, wherein the first layer and the second layer are produced by means of sintering compressed powder mixtures representing the chemical composition of the first layer and the second layer.

12. The electrical contact tip according to claim 1, wherein the body further comprises a third layer arranged on an opposite side of the second layer, which third layer has the purpose of attaching the electrical contact tip to an electrical conductor.

13. An electrical switching device comprising an electrical contact tip including: a body comprising a first layer and a second layer, the first layer is arranged on the second layer and is configured to come in contact with a corresponding contact tip during switching operations, wherein the first layer and the second layer are each made of a sintered Ag-composite, the Ag-composites of the first layer and the second layer each having an Ag-matrix with impurities and one or more elements, compounds, or alloys distributed in the Ag-matrix, wherein the hardness of the first layer is lower than the hardness of the second layer, wherein the thickness of the first layer is between 10% and 40% of the thickness of the second layer, and wherein the Ag-composite of the first layer comes into or out of contact with the corresponding contact tip to provide bypass-isolation switching, and when the first layer is worn off, the Ag-composite of the second layer comes into or out of contact with the corresponding contact tip to provide load switching.

* * * * *